PIEZOELECTRIC CERAMIC COMPOSITIONS

Filed Aug. 15, 1968 2 Sheets-Sheet 1

HIROMU OUCHI AND MASAMITSU NISHIDA,
INVENTORS
By Wenderoth, Lind & Ponack,
Attys

PIEZOELECTRIC CERAMIC COMPOSITIONS

Filed Aug. 15, 1968 2 Sheets-Sheet 2

BASE COMPOSITION $Pb(Zn_{1/3}Nb_{2/3})_{0.2}Ti_{0.36}Zr_{0.44}O_3$

BASE COMPOSITION $Pb(Zn_{1/3}Nb_{2/3})_{0.2}Ti_{0.36}Zr_{0.44}O_3$

HIROMU OUCHI AND MASAMITSU NISHIDA
INVENTORS
By Wenderoth, Lind & Ponack Attys

1

3,546,120

PIEZOELECTRIC CERAMIC COMPOSITIONS

Hiromu Ouchi, Toyonaka-shi, Osaka-fu, and Masamitsu Nishida, Osaka-shi, Osaka-fu, Japan, assignors to Matsushita Electric Industrial Co., Ltd., Osaka, Japan Filed Aug. 15, 1968, Ser. No. 752,833
Claims priority, application Japan, Aug. 16, 1967, 42/53,104
Int. Cl. C04b *35/46, 35/48*
U.S. Cl. 252—62.9 8 Claims

ABSTRACT OF THE DISCLOSURE

Piezoelectric ceramic compositions are provided which are polycrystalline ceramics of the type of the ternary system:

$$Pb(Zn_{1/3}Nb_{2/3})O_3—PbTiO_3—PbZrO_3$$

modified with NiO(0.1 to 5% by weight) and $MnO_2$ (0.1 to 5%) by weight. These compositions have high mechanical quality factors ($Q_M$) high planar coupling coefficients ($K_p$), and are useful in ceramic transducers.

This invention relates the piezoelectric ceramic compositions and articles of manufacture fabricated therefrom. More particularly, the invention pertains to novel ferroelectric ceramics which are polycrystalline aggregates of certain constituents. These piezoelectric compositions are sintered to ceramics by per se conventional ceramic techniques and thereafter the ceramics are polarized by applying a D-C (direct current) voltage between the electrodes to impart thereto electromechanical transducing properties similar to the well known piezoelectric effect. The invention also encompasses the calcined product of raw ingredients and the articles of manufacture such as electromechanical transducers fabricated from the sintered ceramic.

The ceramic bodies materialized by the present invention exist basically in solid solution as the ternary system $Pb(Zn_{1/3}Nb_{2/3})O_3—PbTiO_3—PbZrO_3$ modified with combined $MnO_2$ and NiO additives up to 5 weight percent, respectively.

The use of piezoelectric materials in various transducer applications in the production, measurement and sensing of sound, shock, vibration, pressure, etc. has increased greatly in recent years. Both crystal and ceramic types of transducers have been widely used. But because of their potentially lower cost and facility in the fabrication of ceramics with various shapes and sizes and their greater durability for high temperature and/or for humidity than that of crystalline substances such as Rochelle salt, piezoelectric ceramic materials have recently become important in various transducer applications.

The piezoelectric characteristics of ceramics required vary with species of applications. For example, electromechanical transducers such as phonograph pick-up and microphone require piezoelectric ceramics characterized by a substantially high electromechanical coupling coefficient and dielectric constant. On the other hand, it is desired in filter applications of piezoelectric ceramics that the material exhibit a higher value of mechanical quality factor and high electromechanical coupling coefficient. Furthermore, ceramic materials require a high stability with temperature and time in resonant frequency and in other electrical properties.

As more promising ceramic for these requirements, lead titanate-lead zirconate has been widely used. However it is difficult to get a very high mechanical quality factor combined with high planar coupling coefficient in the lead titanate-lead zirconate ceramics.

It is, therefore, a fundamental object of the present

2 invention to provide novel and improved piezoelectric ceramic materials which overcome at least one of the problems outlined above.

A more specific object of the invention is to provide improved polycrystalline ceramics characterized by very high mechanical quality factor combined with high piezoelectric coupling coefficient.

Another object of the invention is the provision of novel piezoelectric ceramic compositions, certain properties of which can be adjusted to suit various applications.

A further object of the invention is the provision of improved electromechanical transducers utilizing, as the active elements, an electrostatically polarized body of the novel ceramic compositions.

These objects of the invention and the manner of their attainment will be readily apparent from a reading of the following description and from the accompanying drawing, in which.

Figure 1:
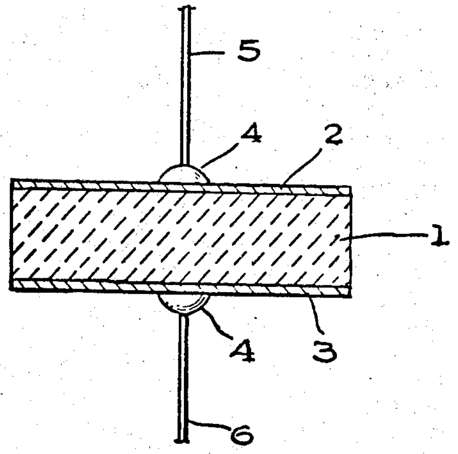
FIG. 1 is a cross-sectional view of an electromechanical transducer embodying the present invention.

Before proceeding with a detailed description of the piezoelectric materials contemplated by the invention, their applications in electromechanical transducers will be described with reference to FIG. 1 of the drawings wherein reference character 7 designates, as a whole an electromechanical transducer having, as its active element, a preferably disc shaped body 1 of piezoelectric ceramic material according to the present invention.

Body 1 is electrostatically polarized, in a manner hereinafter set forth, and is provided with a pair of electrodes 2 and 3, applied in a suitable and per se conventional manner, on two opposed surfaces thereof. Wire leads 5 and 6 are attached conductively to the electrodes 2 and 3 respectively by means of solder 4. When the ceramic is subjected to shock, vibration or other mechanical stress, the generated electrical output can be taken from wire leads 5 and 6. Conversely, as with other piezoelectric transducers, application of electrical voltage to electrodes 5 and 6 will result in mechanical deformation of the ceramic body. It is to be understood that the term "electromechanical transducer," as used herein, is taken in its broadest sense and includes piezoelectric filters, frequency control devices, and the like, and that the invention can also be used and adapted to various other applications requiring materials having dielectric, piezoelectric and/or electrostrictive properties.

According to the present invention, the ceramic body 1, FIG. 1, is formed of novel piezoelectric compositions which are polycrystalline ceramics composed of $$Pb(Zn_{1/3}Nb_{2/3})O_3—PbTiO_3—PbZrO_3$$

modified with combined $MnO_2$ and NiO additives.

It has been found that the ternary system of $$Pb(Zn_{1/3}Nb_{2/3})O_3,\ PbTiO_3 \text{ and } PbZrO_3$$

has a morphotropic phase boundary, and that the piezoelectric property is excellent in the vicinity of morphotropic composition. The present invention is based on the discovery that within particular ranges of the base ternary system, the specimens modified with combined $MnO_2$ and NiO additives exhibit a very high mechanical quality factor combined with high planar coupling coefficient.

The present invention has various advantages in manufacturing process and in application for ceramic transducers. It has been known that the evaporation of PbO during firing is a problem in sintering of lead compounds such as lead titanate zirconate. The invented composition, however, shows a smaller amount of evaporated PbO than usual lead titanate zirconate does. The ternary system can be fired without any particular control of PbO atmosphere. A well sintered body of present composition is obtained by firing in a ceramic crucible with a ceramic cover made of $Al_2O_3$ ceramics. A high sintered density is desirable for humidity resistance and high piezoelectric response when the sintered body is applied to a resonator and others.

Figure 2:
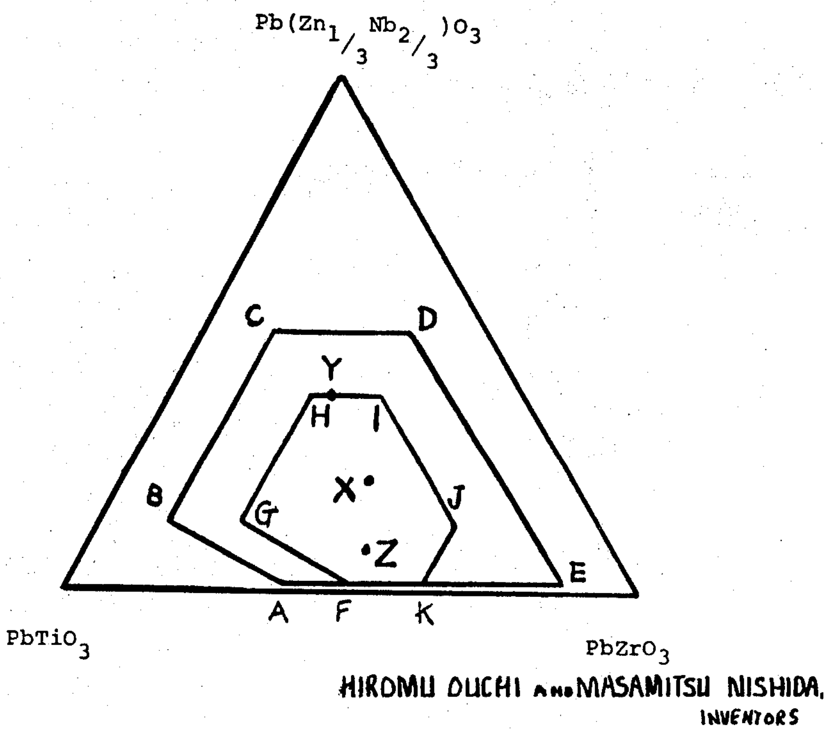
FIG. 2 is a triangular compositional diagram of materials utilized in the present invention.

All possible compositions coming within the ternary system $Pb(Zn_{1/3}Nb_{2/3})O_3$—$PbTiO_3$—$PbZrO_3$ are represented by the triangular diagram constituting FIG. 2 of the drawings. Some compositions represented by the diagram, however, do not exhibit high piezoelectricity, and many are electromechanically active only to a slight degree. The present invention is concerned only with those compositions exhibiting piezoelectric response of appreciable magnitude. As a matter of convenience, the planar coupling coefficient ($K_p$) of test discs will be taken as a measure of piezoelectric activity. Thus, within the area bounded by lines connecting points ABCDE, FIG 2, all compositions polarized and tested show a planar coupling coefficient of approximately 0.1 or higher. Particularly, the compositions in the area of the diagram bounded by lines connecting points FGHIJK, FIG. 2, exhibit a planar coupling coefficient of approximately 0.3 or higher. The molar percent of the three components of compositions ABCDEFGHIJK are as follows:

| | $Pb(Zn_{1/3}Nb_{2/3})O_3$ | $PbTiO_3$ | $PbZrO_3$ |
|---|---|---|---|
| A | 1.0 | 62.5 | 36.5 |
| B | 12.5 | 75.0 | 12.5 |
| C | 50.0 | 37.5 | 12.5 |
| D | 50.0 | 12.5 | 37.5 |
| E | 1.0 | 12.5 | 86.5 |
| F | 1.0 | 50.0 | 49.0 |
| G | 12.5 | 62.5 | 25.0 |
| H | 37.5 | 37.5 | 25.0 |
| I | 37.5 | 25.0 | 37.5 |
| J | 12.5 | 25.0 | 62.5 |
| K | 1.0 | 36.5 | 62.5 |

Furthermore, the compositions near the morphotropic phase boundary, particularly $Pb(Zn_{1/3}Nb_{2/3})_{0.375}Ti_{0.33}Zr_{0.295}O_3$, $Pb(Zn_{1/3}Nb_{2/3})_{0.2}Ti_{0.36}Zr_{0.44}O_3$ and $Pb(Zn_{1/3}Nb_{2/3})_{0.07}Ti_{0.44}Zr_{0.49}O_3$ give ceramic products having a planar coupling coefficient of 0.56 or higher.

According to the present invention it has been discovered that an addition of combined additives of nickel oxide and manganese oxide improves the $Q_M$ and $K_p$ of the ternary solid solution defined by the polygonal area ABCDE in FIG. 2 more extensively than a single addition of nickel oxide or manganese oxide. Operable additive combination comprises 0.1 to 5 weight percent of nickel oxide (NiO) and 0.1 to 5 weight percent of manganese oxide ($MnO_2$).

It is necessary for obtaining high $Q_M$ and high $K_p$ that said additive combination of nickel oxide and manganese oxide have a weight ratio of 0.2 to 10. Operable weight percent of said combination is not more than 6%. An addition of said combination more than 7 weight percent reduces slightly the $K_p$ and clearly the $Q_M$ of the ternary solid solution. An advantageous improvement in the $K_p$ and $Q_M$ of ternary solid solutions defined by and included within the polygonal area FGHIJK in FIG. 2 can be obtained by employing 0.5 to 1 weight percent of additive combination of NiO and $MnO_2$ in a weight ratio of 0.5 to 2. Desirable effects of more specified additions will be readily understood by the specified examples indicated in the following table.

The compositions described herein may be prepared in accordance with various per se well known ceramic procedures. An advantageous method, however, hereinafter more fully described, consists in the use of PbO or $Pb_3O_4$, ZnO, $Nb_2O_5$, $TiO_2$, $MnO_2$ and NiO.

The starting materials, viz., lead oxide (PbO), zinc oxide (ZnO), niobia ($Nb_2O_5$), titania ($TiO_2$), zirconia ($ZrO_2$), $MnO_2$ and NiO, all of relatively pure grade (e.g., C.P. grade) are intimately mixed in a rubber-lined ball mill with distilled water. In milling the mixture, care should be exercised to avoid, or the proportions of ingredients varied to compensate for, contamination by wear of the milling ball or stones.

Following the wet milling, the mixture is dried and mixed to assure as homogeneous a mixture as possible. Thereafter, the mixture is suitably formed into desired forms at a pressure of 400 kg./cm.$^2$. The compacts are pre-reacted by calcination at a temperature of around 850° C. for 2 hours.

After calcination, the reacted material is allowed to cool and is then wet milled to a small particle size. Once again, care should be exercised to avoid, or the proportions of ingredients varied to compensate for, contamination by wear of the milling balls or stones. Depending inter alia on the shapes desired, the material can be formed into a mix or slip suitable for pressing, slip casting, or extruding, as the case may be, in accordance with per se conventional ceramic procedures. The samples for which data are given hereinbelow were prepared by mixing 200 grams of the milled pre-sintered mixture with 10 cc. of distilled water. The mix was then pressed into discs of 20 mm. diameter and 2 mm. thickness at a pressure of 700 kg./cm.$^2$. The pressed discs were fired at a temperature set forth in the Table for a 45 minute heating period. According the the present invention, there is no need to fire the composition in an atmosphere of PbO and no special care is required for the temperature gradient in the furnace, compared with the prior art. Thus, according to the present invention, uniform and excellent piezoelectric ceramic products can be easily obtained simply by covering the samples with an alumina crucible.

The sintered ceramics are polished on both surfaces to the thickness of one millimeter. The polished disc surfaces can then be coated with silver paint and fired to form silver electrodes. Finally, the discs are polarized while immersed in a bath of silicone oil at 100° C. A voltage gradient of D–C 4 kv. per mm. is maintained for one hour, and the discs are field-cooled to room temperature in thirty minutes.

Figure 3:
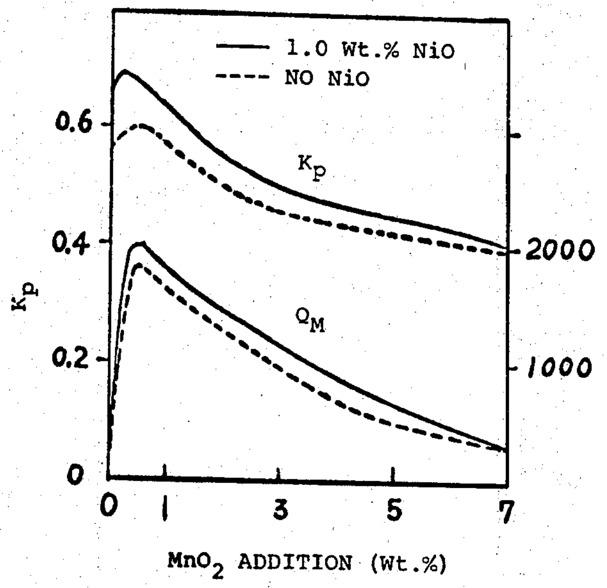
FIG. 3 and 4 are graphs showing the effect of amounts of additives on the mechanical quality factor ($Q_M$) and the planar coupling coefficient ($K_p$) of exemplary compositions according to the present invention at 20° C. and 1 kc.

The piezoelectric and dielectric properties of the polarized specimens are measured at 20° C. in a relative humidity of 50% and at a frequency of 1 kc. The measurement of piezoelectric properties was made by the IRE standard circuit and the planar coupling coefficient was determined by the resonant to antiresonant frequency method. Examples of specific ceramic compositions according to this invention and various pertinent electromechanical and dielectric properties thereof are given in the Table and some of their values are plotted in FIGS. 3 and 4 to show the variation with additives. Compositions without additives and with only one additive are also given in the Table and in FIGS. 3 and 4 for purpose of comparison. From the table it will be readily evident that all exemplary compositions modified with an addition of both 0.1 to 5 weight percent of nickel oxide and 0.1 to 5 weight percent of manganese oxide are characterized by very high mechanical quality factor, high planar coupling, relatively high dielectric constant and low dissipation factor, all of which properties are important to the use of piezoelectric compositions in filter applications. Examples Nos. 1 to 29, Example Nos. 30 to 35 and Example Nos. 36 to 40 listed in the table correspond to compositions defined by X, Y and Z in FIG. 2, respectively. FIG. 3 indicates the effect of amounts of $MnO_2$ addition on the mechanical quality factor ($Q_M$) and the planar coupling coefficient ($K_P$) of exemplary base compositions having 1.0 weight percent of NiO addition. From this figure of drawing, it will be clear that the compositions modified with combined NiO and $MnO_2$ additives exhibit a noticeable improvement of mechanical quality factor and planar coupling coefficient as compared with that of a composition with a single addition of $MnO_2$.

Figure 4:
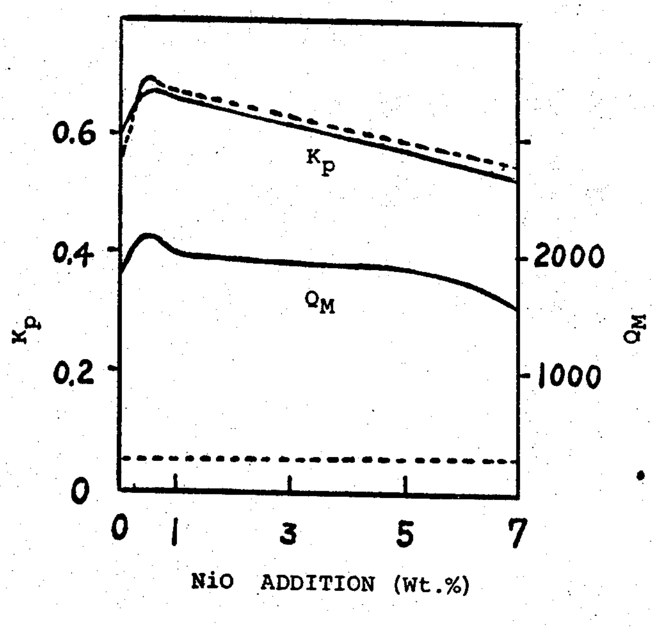

FIG. 4 indicates the effect of amounts of NiO addition on the mechanical quality factor ($Q_M$) and the planar coupling coefficient ($K_p$) of exemplary base compositions having 0.5 weight percent of $MnO_2$ addition. From this figure of drawing, it will be clear that the compositions modified with combined $MnO_2$ and NiO additives exhibit a remarkable improvement of mechanical quality factor as compared with that of a composition with a single addition of NiO. The planar coupling coefficient of compositions modified with combined $MnO_2$ and NiO additives show a somewhat lowered value, but this value is still higher than that of the basic composition without additive. Improvements in mechanical quality factor for another base composition are also seen for the Examples Nos. 32, 33, 35, 38 and 40 in the table. From the foregoing table and curves, the values of the mechanical quality factor, planar coupling coefficient and dielectric constant can be adjusted to suit various applications by selecting the base composition and the amounts of combined additives. With ceramic compositions containing combined additives of more than 7 weight percent respectively, improvement of the mechanical quality factor is hardly noticeable and their planar coupling coefficient is low. For this reason they are excluded from the scope of the present invention.

In addition to the superior properties shown above, compositions according to the present invention yield ceramics of good physical quality and which polarize well. It will be understood from the foregoing that the ternary solid solution $Pb(Zn_{1/3}Nb_{2/3})O_3$-$PbTiO_3$-$PbZrO_3$ modified with combined $MnO_2$ and NiO additives form an excellent piezoelectric ceramic body.

While there have been described presently preferred embodiments of this invention, various minor changes and modifications can be made therein without departing from the invention, and it is aimed, therefore, to cover in the appended claims all such changes and modifications as fall within the true spirit and scope of the invention.

TABLE

| Example No. | Intended composition: Base composition | Additives in weight percent: $MnO_2$ | Additives in weight percent: NiO | Firing temp., ° C. | 24 hours after poling: Mechanical quality factor, $Q_M$ | 24 hours after poling: Planar coupling coeff., $K_p$ |
|---|---|---|---|---|---|---|
| 1 | $Pb(Zn_{1/3}Nb_{2/3})_{0.2}Ti_{0.36}Zr_{0.44}O_3$ | None | None | 1,220 | 253 | 0.56 |
| 2 | Same as above | | 1.0 | 1,190 | 259 | 0.67 |
| 3 | do | 0.1 | | 1,210 | 712 | 0.57 |
| 4 | do | 0.1 | 1.0 | 1,210 | 1,150 | 0.68 |
| 5 | do | 0.2 | | 1,210 | 1,100 | 0.59 |
| 6 | do | 0.2 | 1.0 | 1,190 | 1,632 | 0.69 |
| 7 | do | 0.5 | | 1,210 | 1,797 | 0.60 |
| 8 | do | 0.5 | 1.0 | 1,190 | 1,998 | 0.66 |
| 9 | do | 1.0 | | 1,210 | 1,605 | 0.57 |
| 10 | do | 1.0 | 1.0 | 1,190 | 1,802 | 0.63 |
| 11 | do | 3.0 | | 1,190 | 950 | 0.45 |
| 12 | do | 3.0 | 1.0 | 1,190 | 1,163 | 0.49 |
| 13 | do | 5.0 | | 1,170 | 504 | 0.42 |
| 14 | do | 5.0 | 1.0 | 1,190 | 652 | 0.45 |
| 15 | do | 7.0 | | 1,150 | 298 | 0.39 |
| 16 | do | 7.0 | 1.0 | 1,170 | 335 | 0.40 |
| 17 | do | | 0.1 | 1,210 | 258 | 0.60 |
| 18 | do | 0.5 | 0.1 | 1,210 | 1,870 | 0.63 |
| 19 | do | | 0.2 | 1,210 | 260 | 0.62 |
| 20 | do | 0.5 | 0.2 | 1,210 | 1,996 | 0.64 |
| 21 | do | | 0.5 | 1,210 | 265 | 0.69 |
| 22 | do | 0.5 | 0.5 | 1,210 | 2,124 | 0.67 |
| 23 | do | 0.5 | 1.0 | 1,190 | 2,002 | 0.66 |
| 24 | do | | 3.0 | 1,190 | 270 | 0.63 |
| 25 | do | 0.5 | 3.0 | 1,190 | 1,915 | 0.62 |
| 26 | do | | 5.0 | 1,190 | 281 | 0.59 |
| 27 | do | 0.5 | 5.0 | 1,190 | 1,870 | 0.57 |
| 28 | do | | 7.0 | 1,190 | 288 | 0.55 |
| 29 | do | 0.5 | 7.0 | 1,190 | 1,540 | 0.53 |
| 30 | $Pb(Zn_{1/3}Nb_{2/3})_{0.375}Ti_{0.33}Zr_{0.295}O_3$ | None | None | 1,200 | 135 | 0.60 |
| 31 | Same as above | | 0.5 | 1,200 | 139 | 0.66 |
| 32 | do | 0.5 | 0.5 | 1,200 | 1,698 | 0.65 |
| 33 | do | 1.0 | 0.5 | 1,200 | 1,860 | 0.61 |
| 34 | do | | 1.0 | 1,200 | 127 | 0.68 |
| 35 | do | 0.5 | 1.0 | 1,200 | 1,625 | 0.66 |
| 36 | $Pb(Zn_{1/3}Nb_{2/3})_{0.07}Ti_{0.44}Zr_{0.49}O_3$ | None | None | 1,220 | 143 | 0.61 |
| 37 | Same as above | 0.5 | | 1,220 | 1,190 | 0.58 |
| 38 | do | 0.5 | 0.5 | 1,220 | 1,352 | 0.60 |
| 39 | do | 1.0 | | 1,220 | 1,304 | 0.53 |
| 40 | do | 1.0 | 0.5 | 1,220 | 1,493 | 0.55 |

What is claimed is:

1. A piezoelectric ceramic composition consisting essentially of a solid solution of a base material expressed by the general formula $Pb(Zn_{1/3}Nb_{2/3})_xTi_yZr_zO_3$, wherein $x+y+z=1$, and having a composition within a polygonal area ABCDE of FIG. 2, the molar ratios of the vertices of said area being:

| | x | y | z |
|---|---|---|---|
| A | 0.010 | 0.625 | 0.365 |
| B | 0.125 | 0.750 | 0.125 |
| C | 0.500 | 0.375 | 0.125 |
| D | 0.500 | 0.125 | 0.375 |
| E | 0.010 | 0.125 | 0.865 |

and 0.1 to 6 weight percent of an additive combination of nickel oxide and manganese dioxide, said nickel oxide and manganese dioxide being present in said ceramic composition in a weight ratio of 0.2 to 10 of nickel oxide to manganese dioxide.

2. An electromechanical transducer having an active element formed from an electrostatically polarized ceramic material consisting essentially of a piezoelectric composition as defined in claim 1.

3. A piezoelectric ceramic composition according to claim 1 wherein the polygonal area of FIG. 2 is FGHIJK and the molar ratios of the vertices of said area are:

| | $x$ | $y$ | $z$ |
|---|---|---|---|
| F | 0.010 | 0.500 | 0.490 |
| G | 0.125 | 0.625 | 0.250 |
| H | 0.375 | 0.375 | 0.250 |
| I | 0.375 | 0.250 | 0.375 |
| J | 0.125 | 0.250 | 0.625 |
| K | 0.010 | 0.365 | 0.625 |

4. An electromechanical transducer having an active element formed from an electrostatically polarized ceramic material consisting essentially of a piezoelectric composition as defined in claim 3.

5. As a piezoelectric transducer element, an electrostatically polarized solid solution ceramic consisting essentially of a base material expressed by the general formula $Pb(Zn_{1/3}Nb_{2/3})_xTi_yZr_zO_3$, wherein $x+y+z=1$ and having a composition within the polygonal area FGHIJK of FIG. 2 wherein the molar ratios of the vertices of said area are:

| | $x$ | $y$ | $z$ |
|---|---|---|---|
| F | 0.010 | 0.500 | 0.490 |
| G | 0.125 | 0.625 | 0.250 |
| H | 0.375 | 0.375 | 0.250 |
| I | 0.375 | 0.250 | 0.375 |
| J | 0.225 | 0.250 | 0.625 |
| K | 0.010 | 0.365 | 0.625 |

and 1.5 weight percent of an additive combination of nickel oxide and manganese dioxide, said nickel oxide and manganese dioxide being present in said ceramic in a weight ratio of 0.5 to 2.0 of nickel oxide to manganese dioxide.

6. A piezoelectric ceramic composition consisting essentially of $Pb(Zn_{1/3}Nb_{2/3})_{0.375}Ti_{0.33}Zr_{0.295}O_3$ and containing 0.5 weight percent of nickel oxide (NiO) and 0.5 weight percent of manganese oxide ($MnO_2$).

7. A piezoelectric ceramic composition consisting essentially of $Pb(Zn_{1/3}Nb_{2/3})_{0.2}Ti_{0.36}Zr_{0.44}O_3$ and containing 0.5 weight percent of nickel oxide (NiO) and 0.5 weight percent of manganese oxide ($MnO_2$).

8. A piezoelectric ceramic composition consisting essentially of $Pb(Zn_{1/3}Nb_{2/3})_{0.07}Ti_{0.44}Zr_{0.49}O_3$ and containing 0.5 weight percent of nickel oxide (NiO) and 0.5 weight percent of manganese oxide ($MnO_2$).

References Cited

UNITED STATES PATENTS 3,403,103 9/1968 Ouchi et al. ________ 252—62.9
3,425,944 2/1969 Ouchi et al. ________ 252—62.9

TOBIAS E. LEVOW, Primary Examiner

J. COOPER, Assistant Examiner

U.S. Cl. X.R.

106—39